Nov. 28, 1961 C. A. KNAPP ET AL 3,010,581
APPARATUS FOR THE TREATMENT OF POLLUTED LIQUIDS
Original Filed April 21, 1958 2 Sheets-Sheet 1

INVENTORS
Charles A. Knapp
William E. Budd
Kurt S. Stone
BY Richard O. Church

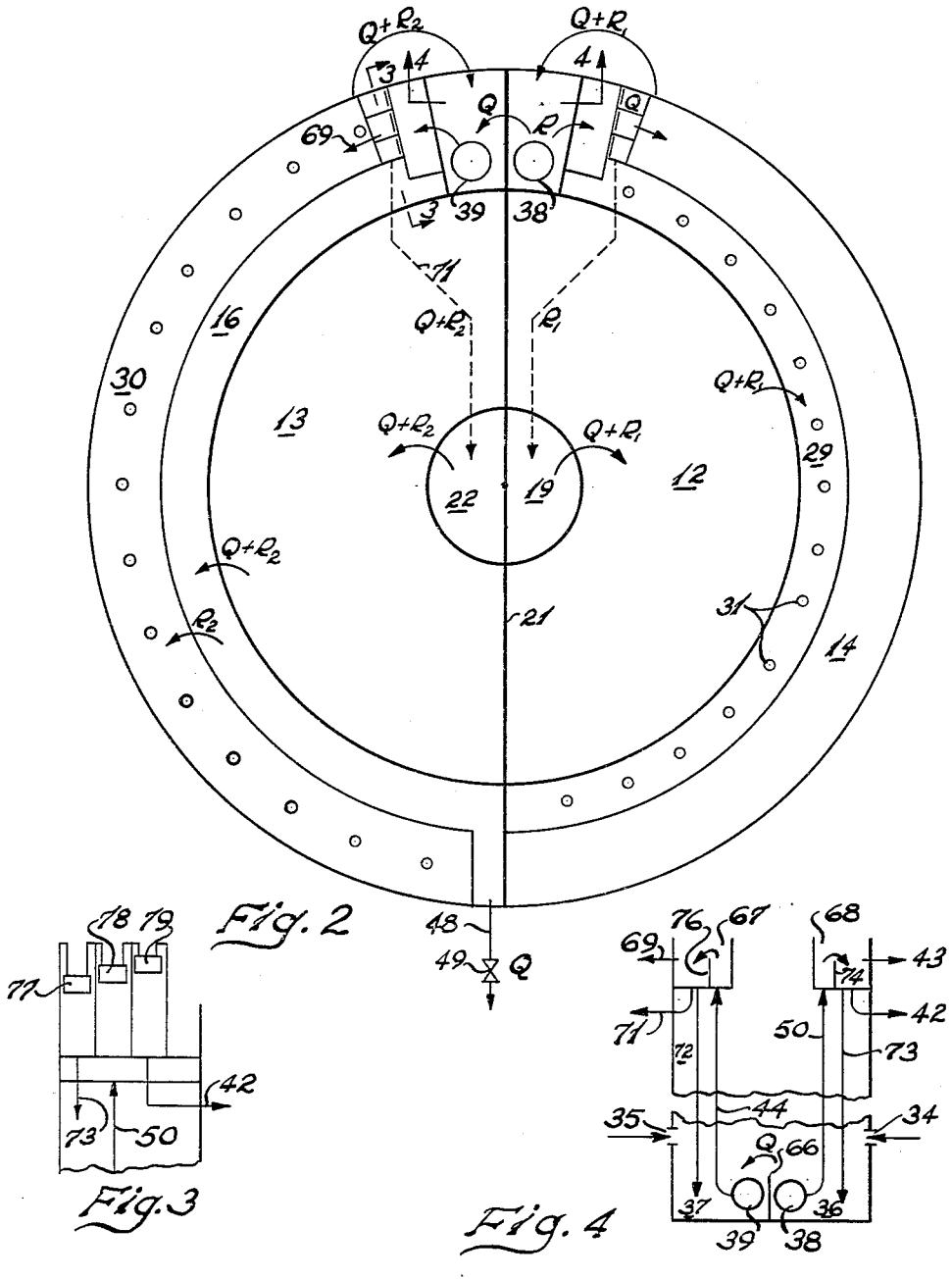

3,010,581
APPARATUS FOR THE TREATMENT OF POLLUTED LIQUIDS
Charles A. Knapp, Glenbrook, William E. Budd, Ridgefield, and Kurt S. Stone, Norwalk, Conn., assignors to Dorr-Oliver, Incorporated, Stamford, Conn.
Continuation of application Ser. No. 729,882, Apr. 21, 1958. This application Aug. 17, 1959, Ser. No. 836,566
15 Claims. (Cl. 210—151)

This invention relates to apparatus for the treatment of organically polluted liquid wastes such as sanitary sewage and industrial wastes, and more particularly relates to a unitary, multi-compartment apparatus for the treatment of such wastes.

The primary purpose of treating organically polluted liquids, whether such liquids be in the nature of sanitary sewage or industrial wastes, is to eliminate or minimize the nuisances and health hazards attendant to their discharge into bodies of water. Among the harmful effects arising from the discharge of untreated or insufficiently treated polluted liquids are the presence of solids, the generation of putrefactive odors, and the destruction of fish and other aquatic life in the receiving waters. In the large majority of cases, these effects are caused not only by properties of the polluting constituents themselves, but also by their bacterial decomposition, and the consequent depletion of the dissolved oxygen content of the receiving waters. The problem consequently resolves itself into providing means whereby the polluting constituents of waste flow are separated from the liquid and/or are stabilized under controlled conditions.

Treatment processes have been developed whereby the polluting constituents contained in waste flows may be so separated and stabilized. Broadly speaking, these processes may be classified according to the dissolved oxygen content of the liquid undergoing treatment. Those processes carried out in the presence of dissolved oxygen are referred to as being aerobic, while those in which dissolved oxygen is not present are referred to as being anaerobic.

Apparatus utilized in these processes generally may be categorized as falling into two main groups. The first of these groups includes apparatus that function solely as mechanical or physical separating means to remove solid polluting materials from the liquid. Such apparatus includes devices such as bar racks, screens, and gravity settling clarifiers. The second group includes those devices which exert not only a physical function, but also a bio-chemical one. This group may be exemplified by installations such as trickling filters, activated sludge aeration contact tanks, and digesters. Generally speaking, the devices of the first group may be used alone to accomplish so-called "primary" treatment, or they can be used in conjunction with one or more devices for "secondary" treatment and thus accomplish "complete" treatment of polluted wastes. While in some instances satisfactory treatment of polluted liquids can be achieved solely by primary treatment of the liquids, for example as when the treated liquids can be discharged to the ocean or other large bodies of water, the rise of urban populations generally requires the complete treatment of the resulting waste liquids. In such urban centers, the complete treatmest of sewage and industrial wastes is accomplished by utilizing apparatus for both the primary and secondary treatment of such liquid wastes, that is, at least one gravity settling device, such as a clarifier, and at least one secondary treatment device, such as an aerobic trickling filter, are used. Generally this complete treatment is combined with anaerobic digestion of solids that settle out of the clarifier. Additionally, anaerobic treatment of the raw incoming liquids prior to their clarification is sometimes desirable.

Apparatus arrangements heretofore employed to achieve the complete treatment of polluted liquids, while satisfactory for large installations and municipalities, are not practical for smaller units such as housing developments, camps, schools, isolated service stations and smaller manufacturing facilities. This is for the reason that at least three separate pieces of equipment must be installed, that is a clarifier, a trickling filter and an anaerobic digester. Not only do such prior arrangements known to the prior art require excessive amounts of space, but also the initial expense of such equipment cannot economically be justified for the treatment of such low volumes of polluted liquids.

It is, therefore, the principal object of this invention to provide apparatus whereby the complete treatment of polluted liquid wastes can economically and efficiently be conducted in a unitary multipurpose device.

A related object of this invention is to provide apparatus for the complete treatment of polluted liquid wastes that is of a semi-portable nature.

A further object of this invention is to provide a unitary apparatus whereby both primary and secondary treatment can economically be given to comparatively low volumes of polluted liquids.

Quite briefly, the objects of this invention are accomplished by a novel arrangement whereby means are provided within a unitary structure which enable the treatment of liquid wastes by both primary and secondary treatment means. Additionally, provision is made whereby the secondary treatment may include both aerobic and anaerobic treatment. By utilizing the concept of the present invention, a semi-portable, unitary apparatus is provided that enables complete treatment of waste liquids in amounts required by up to 150 people or its equivalent.

In regard to the aspect of semi-portability, the invention contemplates the possibility of a unit fabricated from sheet metal, or perhaps other suitable sheet materials as may later be developed, more or less on a mass production basis, thereby making possible an entirely new concept of immediately available "packaged" sewage treatment plants in a form which can be transported to any required site at short notice, requiring at installation only the hooking-up of the driving mechanism, external piping and the addition of the rocks for the trickling filter. Naturally there is a size limit beyond which portability is not feasible, however, it is contemplated that, with the adaptation of quantity production techniques, the price of a packaged complete treatment unit should make possible the installation of several units at a price considerably less than a full scale permanent sewage treatment plant. In growing communities additional units can be installed as and when required, and, if a permanent full scale plant should eventually be installed, the packaged unit according to the invention remains as a saleable unit which can be sold and transported to another site. Most significant, however, the fact still remains that the invention makes possible for a small community, a complete treatment plant which it could not otherwise afford.

In order that it may be clearly understood and readily carried into effect, the invention will now be described by way of example, with reference to the accompanying drawings, in which—

FIGURE 2 is a schematic plan view of the preferred embodiment of the invention as shown in FIGURE 1.

FIGURE 3 is a view taken in the plane of lines 3—3 of FIGURE 2, the elements being shown schematically for purposes of clarity.

FIGURE 4 is a view taken in the plane of lines 4—4 of FIGURE 2, the elements being shown schematically for purposes of clarity.

Figure 1:
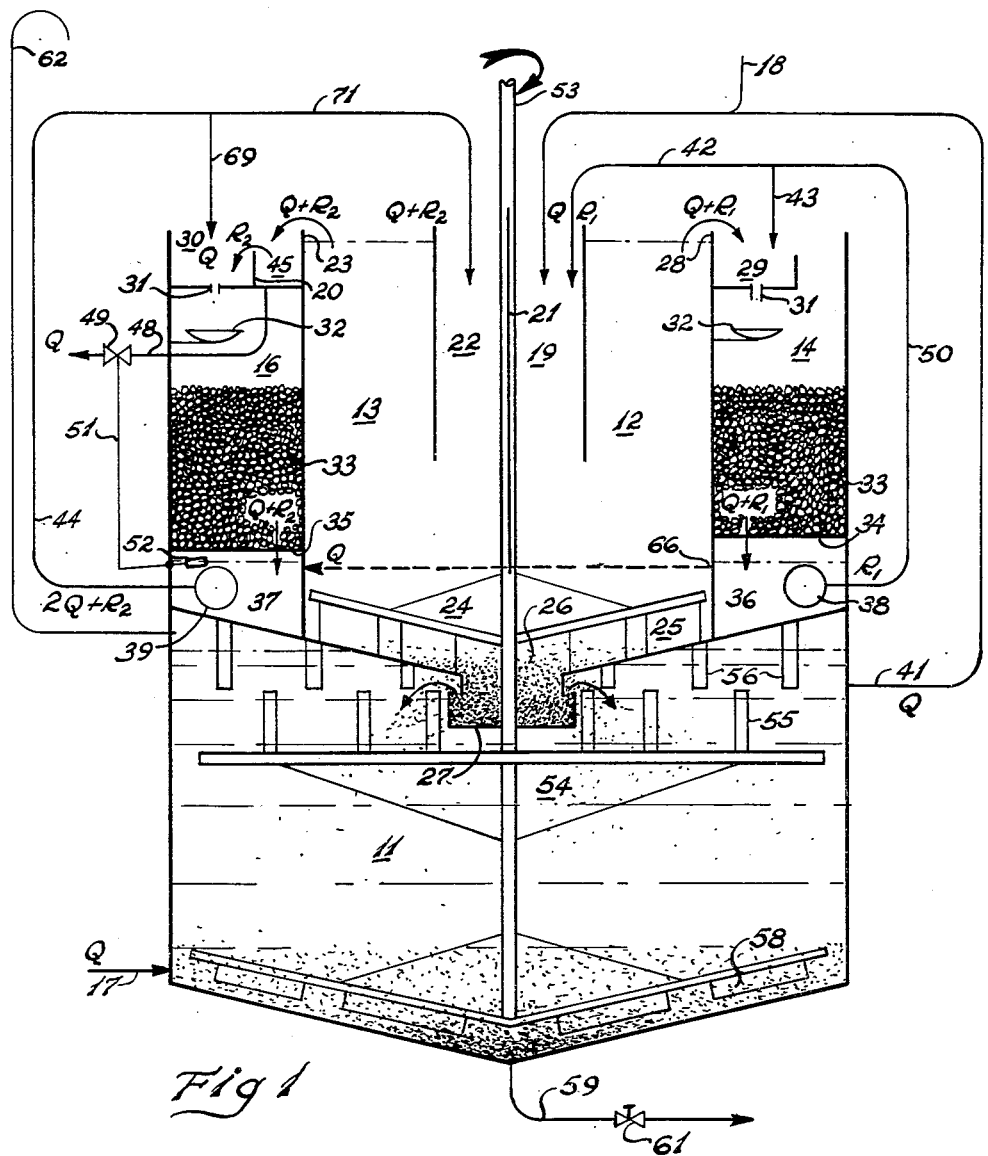
FIGURE 1 is a schematic drawing partly in elevation showing a preferred embodiment of the invention.
Figure 5:
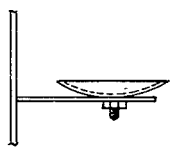

FIGURE 5 is an enlarged elevation of certain details of the structure shown in FIGURE 1.

With reference to the drawings, there is illustrated in schematic form a single unit for the "complete" treatment of polluted waste liquids. Generally there is illustrated an anaerobic digestion chamber 11, a primary clarification chamber 12, a secondary clarification chamber 13, a primary trickling filter 14 and a secondary trickling filter 16.

It is to be understood that while the conduits communicating between the various chambers of the apparatus shown schematically in FIGURE 1 are shown as being located outside of the body of the apparatus, these conduits, in actual practice, are preferably located entirely within the unitary shell. This schematic showing is used for simplicity in order that the invention may be more clearly understood.

Polluted waste liquids to be treated are introduced into the apparatus via raw feed supply conduit 17 which communicates with digester compartment 11. Conduit 17 is positioned to discharge influent liquids into the body of sludge within the bottom of digester 11 in order that waste liquids may first be subjected to anaerobic treatment. This method of treatment may be particularly advantageous when the threatment wastes contain a high proportion of emulsified greases or fatty materials. Optionally, when there is a low percentage of fats and greases in the waste liquid, influent may be fed directly to the clarification compartment via feed conduit 18.

Liquids, having been subjected to anaerobic treatment, are displaced from digester 11 into conduit 41 and are conducted into feedwell 19 which serves to distribute feed material into primary clarification chamber 12. Similarly, feedwell 22 is provided to distribute feed liquids into secondary clarification chamber 13. As can best be seen in FIGURE 2, primary clarifier 12 and secondary clarifier 13, as well as primary feedwell 19 and secondary feedwell 22, are separated by means of partition plate 21. The partition plate 21 extends from above the surface of the liquid to a point terminating slightly above the bottom of the clarifying compartments thus providing submerged hydraulic communication between the several clarifiers 12 and 13.

A zone of comparative quiescence is maintained within primary clarification chamber 12 enabling sludge to settle from the waste liquid. Such sludge settles to the bottom of the clarification chamber 12 and is impelled by rake mechanism 24 and its associated blades 25 to discharge at orifice 26. Settled sludge discharged through orifice 26 enters the anaerobic digestion chamber 11 via sludge boot 27. Sludge boot 27 serves to form a seal to prevent the escape of liquids and gases upwardly from digester 11 through orifice 26 while simultaneously enabling sludge discharged from the bottom of both the primary and secondary clarifiers 12 and 13 to enter the digestion compartment 11. Gases of digestion escape from digestion compartment 11 by way of a vent conduit 62.

Clarified effluent from primary clarifier 12 overflows an adjustable weir 28 into a distribution launder 29. Openings 31, located in the bottom of launder 29, permit the treatment liquid to fall by gravity into primary filter chamber 14. Trickling filter 14 contains a coarse bed of stones 33 which provide a suitable environment wherein aerobic treatment of the liquid can proceed. To achieve even distribution of the liquid undergoing treatment over the cross-sectional area of the bed 33, a splash plate 32 is interposed between the gravel bed 33 and the launder discharge opening 31. Liquid that has been subjected to aerobic treatment in trickling filter 14 enters underdrain 34 and spills into primary sump 36. Submersible pump 38 is located in sump 36 and serves to recycle a portion of treatment liquid to the primary clarifier via conduits 50 and 42 and feedwell 19. Alternatively, any portion of this recycled liquid can be introduced via conduit 43 directly into launder 29 for further aerobic treatment in primary trickling filter 14, thus bypassing primary clarifier 12. Amounts of treatment liquid not recycled by pump 38 overflow weir 66 and enter secondary sump 37. Pump 39, which for reasons that will soon be apparent, operates at a constant volume output and pumps all of the liquid entering sump 37 into weir box 67. As will be discussed later in more detail with relation to FIGURES 3 and 4, treatment liquid overflows adjustable weirs in weir box 67 and circulates in part to feedwell 22 for treatment in secondary clarifier 13 and in part to a distribution launder 30 for circulation through secondary trickling filter 16. Clarified liquor from secondary clarifier 13 overflows adjustable weir 23 and enters a final effluent discharge launder 45. A portion of the liquid is removed from launder 45 via conduit 48, valved as at 49, and represents effluent which has now been subjected to both primary and secondary treatment.

The portion of liquid in launder 45 not discharged via conduit 48 is discharged over weir 20 into launder 30. Similarly to the operation of the primary trickling filter 14, material in launder 30 discharges by gravity through orifices 31 onto saucer-shaped splash plate 32 and is distributed across the cross-sectional area of the stone bed 33 of secondary filter 16. Treatment liquid discharges from underdrain 35 in the bottom of trickling filter 16 into secondary sump 37. Treatment liquid is pumped from sump 37, as before noted, to secondary filter launder 30 and secondary clarifier feedwell 22.

With further reference to FIGURE 1, it can be seen that a raking mechanism 24 and a raking mechanism 57 are provided to remove settled sludge from the clarification and digestion chambers respectively. Raking mechanism 24 supports rake blades 25 as raking mechanism 57 supports rake blades 58. The sludge is impelled toward the central portion of the digestion chamber by rake blades 58 and is periodically removed via underdrain 59 valved as at 61 by means of a pump, not shown in the drawings, or by hydraulic displacement.

Raking mechanisms 24 and 57 are constantly rotated by rotation of shaft 53 to which they both are attached. Also attached to shaft 53 for rotation therewith is scum breaker 54 to which are attached pickets 55. Pickets 55 rotate between stationary pickets 56 to create shear forces which tend to break up accumulated scum within the top of the digestion chamber 11.

To more clearly define the preferred flow of liquids throughout the above system, the drawings will be described with relation to the reference letters Q, $R_1$ and $R_2$, it being understood, however, that such flows are illustrative only and other hydraulic balanced systems can be substituted. As herein defined, Q represents the throughput of the apparatus and is, therefore, also equivalent to the influent and effluent; $R_1$ equals the recirculation to the primary clarifier and filter; and $R_2$ equals the recirculation to the secondary clarifier. It may be seen that a quantity Q is introduced into digester compartment 11 and is led from this compartment via conduit 41 to primary clarifier feedwell 19. Also introduced into the primary clarifier feedwell 19 is a quantity of recycled material $R_1$.

$Q+R_1$ overflow primary clarifier 12 and are discharged into and through primary filter 14. $Q+R_1$ pass through underdrain 34 and into primary sump 36. A quantity $R_1$ is recycled into primary feedwell 19 via pump 38 while the remaining portion Q in sump 36 overflows weir 66 and enters secondary sump 37. Pump 39 discharges a quantity $2Q+R_2$. Of this amount, an amount equal to $Q+R_2$ is recycled to secondary clarifier feedwell 22 while the remaining portion Q is discharged directly into launder 30 for circulation through secondary trickling filter 16.

Overflow from secondary clarifier 13 is equal to an amount $Q+R_2$ which overflows weir 23 and enters launder 45. A quantity Q of treated effluent is discharged from launder 45 via conduit 48 and valve 49. Valve 49 is, through suitable linkage 51, attached to level sensing device 52 and is therefore responsive to the liquid level in secondary sump 37. That portion of liquid introduced into launder 45 not discharged via conduit 48 and valve 49, overflows weir 20 into launder 30 in an amount equal to $R_2$. Therefore, a quantity equal to $Q+R_2$ passes through underdrain 35 and enters secondary sump 37 to join with quantity Q overflowing from primary sump 36. Launder 45 and associated weir 20 serve to insure that effluent leaves the system only after it has been subjected to final clarification in the secondary clarifier 13. Further, weir 20 enables the maintenance of a hydrostatic head on conduit 48 to prevent air blinding in conduit 48 and valve 49.

With particular reference to FIGURES 3 and 4, there is illustrated a novel means by which circulation and recirculation of treatment liquid is adjustably controlled within this apparatus. Referring to FIGURE 4 it can be seen that liquids discharging from primary trickling filter 14 via underdrain 34, spill into primary sump 36. A submersible pump 38, located within sump 36, pumps liquids undergoing treatment at a constant rate through conduit 50 and into weir box 68. Weir box 68 is constructed as illustrated in FIGURE 3 wherein three adjustable weirs 77, 78 and 79 are provided to allow such liquids to overflow weir box 68 at controllably variable rates into three separate chambers. Liquid entering one of these chambers, if desired, is discharged via conduit 43 to primary trickling filter launder 29. Liquids overflowing into the second compartment are discharged via conduit 42 to primary clarifier feedwell 19. Liquids which overflow into the third compartment represent excess pump capacity and are, therefore, returning to sump 36 via conduit 73.

That quantity of treatment liquid which is not recycled by the action of pump 38 (Q) overflows weir 66 and enters secondary sump 37. As previously discussed in relation to the primary sump 36, pump 38 and weir box 68, pump 39 delivers liquid from sump 37 to weir box 67 wherein the treatment liquid overflows three weirs and enters three separate collection chambers at individually controllable rates. Liquids entering the first compartment $(Q+R_2)$ are conducted via conduit 71 into secondary clarifier feedwell 22. Liquid collected in the second compartment (Q) is conducted via conduit 69 into secondary trickling filter launder 30. All remaining treatment liquid is discharged from the third compartment back into sump 37 via conduit 72.

As previously noted, the quantity of effluent discharged from the system is controlled by a float 52 located within secondary sump 37. This ensures that a constant quantity Q will be discharged as effluent from the system and establishes a reasonably constant level within sump 37.

The above described system of weirs and weir boxes, which provides entirely novel ways and means enabling the practice of this invention, is of considerable utility because of the flexibility of operation thereby attained. The submersible pumps 38 and 39 can be run at a constant rate of output while the liquids entering, leaving, and being recycled throughout the system, can be readily adjusted without the necessity of altering the pumping rates. This is of considerable importance from an apparatus standpoint because the adjustment of weirs in a readily accessible location is far easier and more satisfactory than attempting to control the speed and output of the submersible pumps. Further, by providing means whereby the excess liquid may be returned from the weir box to the pump sumps, it is possible to utilize larger pumps that will pump at greater capacities. This enables a more satisfactory selection of pumps and provides for a sufficient flow through the pumps and associated conduits to prevent clogging by stray solid materials. An additional advantage is gained by allowing excess pumped liquid to be returned to the sump as some aerobic treatment of the liquid falling into the sump is obtained.

While the preferred embodiment of this invention has been discussed above with specific relationship to two-stage primary and secondary treatment of polluted waste liquids, the invention should not be considered as being so limited, as it may readily be seen that this unitary apparatus could be designed to include but a single primary and secondary treatment stage. Other modifications which are within the ambit of this invention will be readily apparent to those skilled in the art. As, for example, the primary and secondary sumps could be combined into but a single sump and thus eliminate the need of one of the two submersible pumps. In this latter modification an additional overflow weir and compartment would be provided within weir box 67 that would provide means for recycling material to primary clarifier feedwell 19.

This application is a continuation of application Serial No. 729,882 filed April 21, 1958, now abandoned.

We claim:

1. Apparatus for the treatment of polluted liquid wastes comprising a substantially cylindrical unitary structure, a digester compartment in the lower portion of said structure, separate first and second clarifier compartments in an upper central portion of said cylindrical structure, separate first and second trickling filters in said cylindrical structure at an elevation above said digester compartment and concentric with both of said first and second clarifier compartments, separate first and second sumps positioned respectively with relationship to said first and second filters to receive gravity discharged liquid from said first and second filters, means for transferring liquid undergoing treatment from said digester compartment to said first clarifier compartment, means for transferring clarified liquid from said first clarifier compartment to said first filter, means for downwardly discharging accumulated sludge from said first clarifier compartment to said digester compartment, means for discharging sludge from said digester compartment, means for the gravity discharge of liquid from said first filter to be collected in said first sump, means for upwardly transferring a first portion of liquid collected in said first sump to said first clarifier compartment and means for discharging the remaining portion of said liquid collected in said first sump to said second sump, means for discharging a first portion of liquid collected in said second sump to said second clarifier compartment and another portion to said second filter, means for discharging clarified liquid from said second clarifier compartment to a launder positioned adjacent the top of said second clarifier compartment, means for discharging sludge from said second clarifier to said digester, valved conduit means for discharging as treated effluent a first portion of liquid from said launder, means for discharging the remaining portion of said liquid from said launder to said second filter, and means for discharging filtered liquid from said second filter to said second sump.

2. Apparatus according to claim 1 in which means for introducing polluted raw feed influent liquid into said structure is positioned to introduce said liquid into said digester compartment.

3. Apparatus according to claim 1 in which means to introduce polluted raw feed influent liquid into said apparatus is positioned to introduce said liquid into said first clarifier compartment.

4. Apparatus according to claim 1 in which liquid introduced into said first and said second clarifier compartment is discharged into said clarifiers by means of respective first and second distribution feedwells.

5. Apparatus according to claim 1 in which the flow through said valved conduit means for discharging treated effluent is responsive to the liquid level within said second sump.

6. Apparatus according to claim 1 in which said means for discharging liquid from said second sump to said second clarifier compartment and said second filter comprises: a pump located in said second sump, conduit means communicating between said pump and a weir box, said weir box comprising a container to receive liquid from said second sump and at least three adjustable weirs that communicate with three separate compartments whereby the flow of liquid passing over said three weirs and into their respective said three compartments can be separately and controlledly adjusted, means for discharging liquid from the first of said separate compartments to said second clarifier compartment, means for discharging liquids from said second separate compartment to said second filter and means for discharging liquids from the third of said separate compartments to said second sump.

7. Apparatus according to claim 1 in which said means for discharging liquid from said first sump to said first clarifier compartment and said first filter comprises: a pump located in said first sump, conduit means communicating between said pump and a weir box, said weir box comprising a container to receive liquid from said first sump and at least three adjustable weirs that communicate with three separate compartments whereby the flow of liquid passing over said three weirs and into their respective said three compartments can be separately and controlledly adjusted, means for discharging liquid from the first of said separate compartments to said first clarifier compartment, means for discharging liquids from said second separate compartment to said first filter and means for discharging liquids from the third of said separate compartments to said first sump.

8. Apparatus according to claim 1 in which said means for discharging clarified liquid from said first clarifier compartment to said first filter include a weir for overflowing clarified liquid from said first clarifier to a collection trough, orifice means for discharging liquids by gravity from said trough to said first filter and removable dished shaped splash plate means removably mounted on bracket means disposed between said orifice means and said first filter means whereby liquid discharged through said orifice means impinges upon said splash plate means and is uniformly distributed across the cross-sectional area of said first filter.

9. Apparatus according to claim 1 in which said means for discharging said remaining portion of liquid from said launder to said second filter include a weir for overflowing clarified liquids from said launder to a collection trough, orifice means for discharging liquids by gravity from said trough to said second filter and removable dished shaped splash plate means removably mounted on bracket means disposed between said orifice means and said second filter means whereby liquids discharged through said orifice means impinge upon said splash plate means and are uniformly distributed across the cross-sectional area of said second filter.

10. Apparatus according to claim 8 in which said first pump displaces a constant volume.

11. Apparatus according to claim 7 in which said second pump displaces a constant volume.

12. Apparatus for effecting the complete treatment of polluted liquors to produce a digested sludge and a final clarified effluent which has been subjected to primary and secondary clarification and biological filtration, such apparatus comprising a tank having peripheral walls, a bottom and a partition disposed in a horizontal plane extending to the side walls at a level intermediate the top and the bottom of said side walls and having an opening at its center to define in said tank above said partition a clarification section super-imposed over a digestion compartment below said partition and in hydraulic communication with the clarification section through the central opening of said partition for the transfer of solids settled in the clarification section to said digestion compartment, a substantially transverse vertical baffle dividing said clarification section into a primary clarification compartment and a secondary clarification compartment, means for introducing liquor to be treated into said primary clarification compartment, means for discharging digested sludge from said digestion compartment, a trickling filter compartment surrounding said clarification section, distribution launder means substantially co-extensive with the walls of said primary and secondary clarification chambers adapted to receive clarified liquid from said primary and secondary clarification chambers and to distribute the same over the surface of said trickling filter, sump means adapted to receive filtered liquid filtered by passage through said trickling filter, circulating pump means operable for feeding such filtered liquid from said sump means to said secondary clarification chamber, a finally clarified effluent collection and discharge launder positioned to receive overflow from said secondary clarification chamber and adapted to receive clarified effluent for discharge from the apparatus, and control means operative to maintain the volume of finally clarified effluent discharged equal to the volume of raw feed liquor being concurrently introduced into the apparatus.

13. Apparatus according to claim 12, characterized by the provision of means for introducing the raw influent polluted liquor into an active zone of digestion in said digestion compartment and by the provision of means for conducting digestion supernatant from the upper part of said digestion compartment to said primary clarification compartment.

14. Apparatus according to claim 12, characterized by the fact that the clarification section is defined by a vertical wall forming a vertical well within the tank and spaced from the peripheral walls of the tank whereby to define, between said vertical wall and said peripheral wall of the tank, space to accommodate the rock material of the trickling filter.

15. Apparatus according to claim 12, wherein the tank, the clarification section, baffle and partition are fabricated from sheet material and, with the launder means are assembled to constitute a transportable unitary structure.

References Cited in the file of this patent
UNITED STATES PATENTS

| | | |
|---|---|---|
| 2,340,842 | Reybold et al. | Feb. 1, 1944 |
| 2,355,760 | Trebler | Aug. 15, 1944 |
| 2,553,228 | Yonner | May 15, 1951 |
| 2,661,332 | Mortenson | Dec. 1, 1953 |